United States Patent
Gopal et al.

(10) Patent No.: US 8,209,239 B2
(45) Date of Patent: Jun. 26, 2012

(54) METHOD, SYSTEM, AND PROGRAM PRODUCT FOR EXCHANGING CATALOGUE INFORMATION

(75) Inventors: Vasanthi M. Gopal, Plainsboro, NJ (US); Lisa M. O'Brien, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 11/684,270

(22) Filed: Mar. 9, 2007

(65) Prior Publication Data
US 2008/0222011 A1 Sep. 11, 2008

(51) Int. Cl.
*G06F 17/30* (2006.01)
(52) U.S. Cl. ...................... 705/27.1; 705/26.1
(58) Field of Classification Search ............ 705/26, 705/27, 26.1, 27.1
See application file for complete search history.

(56) References Cited

U.S. PATENT DOCUMENTS

| | | | |
|---|---|---|---|
| 6,904,439 B2 | 6/2005 | Tang et al. | |
| 6,970,840 B1 | 11/2005 | Yu et al. | |
| 7,051,000 B2 | 5/2006 | Kodama et al. | |
| 7,065,502 B2 | 6/2006 | Ko et al. | |
| 7,461,067 B2 * | 12/2008 | Dewing et al. | 1/1 |
| 2003/0050862 A1 * | 3/2003 | Bleicken et al. | 705/27 |
| 2003/0050958 A1 * | 3/2003 | Keller et al. | 709/201 |
| 2004/0068532 A1 * | 4/2004 | Dewing et al. | 709/200 |
| 2006/0173755 A1 | 8/2006 | Mihara | |
| 2010/0204970 A1 * | 8/2010 | Loomans et al. | 703/6 |

OTHER PUBLICATIONS

PR Newswire, "QRS introduces the world's most comprehensive product catalog to the hardlines, grocery and food industries", dated Aug 1, 2001.*

Huff et al, "In the market for content", Information week, Jun. 11, 2001.*

* cited by examiner

*Primary Examiner* — Mark Fadok
(74) *Attorney, Agent, or Firm* — Hoffman Warnick LLC; William E. Schiesser

(57) ABSTRACT

The present invention seamlessly facilitates information exchange between not only a vendor and a single customer but also between vendors and Procurement Services Providers (PSPs), supporting more than one customer, each with its unique specifications. This framework also has the capability to handle dual pricing. Dual pricing is used to differentiate the price that a PSP has negotiated with a vendor from the price that an end user/customer will be ultimately charged. These two levels of pricing are maintained at the customer/vendor level. This invention is used to create a framework for exchanging catalogue information between the vendors or vendors of IT products and a customer or a PSP acting on behalf of one or more customers.

26 Claims, 3 Drawing Sheets

METHOD, SYSTEM, AND PROGRAM PRODUCT FOR EXCHANGING CATALOGUE INFORMATION

FIELD OF THE INVENTION

This invention generally relates to information exchange. Specifically, the present invention provides a way to efficiently and uniformly exchange Information Technology (IT) catalogue information between customers and vendors (e.g., vendors, and/or procurement services providers (PSPs) who obtain IT products from the vendors and provide them to the customers).

BACKGROUND OF THE INVENTION

Normally a Business-to-Business or a Business-to-Consumer information exchange involves transactions between two parties, a supplier/vendor or seller and a customer. With the rapid expansion of the on-line world, many of these transactions are taking place in a virtual environment. One particular area of interest is IT products such as hardware (e.g., processors, memory modules, adapters, etc.), and/or software (e.g., applications, operating systems, etc.). Unfortunately, existing systems for conducting such transactions and exchanging information typically support only exchange between a single vendor and a single customer. Moreover, existing solutions typically only support a single pricing scheme, such as that between a vendor and customer, while failing to recognize that a transaction may include a third part such as a PSP who may introduce a second pricing level.

In view of the foregoing, there exists a need for an approach that solves at least one of the above-referenced deficiencies in the related art.

SUMMARY OF THE INVENTION

In general, this invention seamlessly facilitates information exchange between not only a vendor and a single customer but also between vendors and Procurement Services Providers (PSPs), supporting more than one customer, each with its unique specifications. This framework also has the capability to handle dual pricing. Dual pricing is used to differentiate the price that a PSP has negotiated with a vendor from the price that an end user/customer will be ultimately charged. These two levels of pricing are maintained at the customer/vendor level. This invention is used to create a framework for exchanging catalogue information between the vendors or vendors of IT products and a customer or a PSP acting on behalf of one or more customers.

A first aspect of the present invention provides a method for exchanging catalogue information, comprising: centrally receiving Information Technology (IT) catalogue information from a plurality of providers, the IT catalogue information comprising a plurality a information levels; consolidating the IT catalogue information into a central catalogue using extensible markup language (XML); and loading the central catalogue into a repository.

A second aspect of the present invention provides a system for exchanging catalogue information, comprising: a module for centrally receiving Information Technology (IT) catalogue information from a plurality of providers, the IT catalogue information comprising a plurality a information levels; a module for consolidating the IT catalogue information into a central catalogue using extensible markup language (XML); and a module for loading the central catalogue into a repository.

A third aspect of the present invention provides a program product stored on a computer readable medium for exchanging catalogue information, the computer readable medium comprising program code for causing a computer system to: centrally receive Information Technology (IT) catalogue information from a plurality of providers, the IT catalogue information comprising a plurality a information levels; consolidate the IT catalogue information into a central catalogue using extensible markup language (XML); and load the central catalogue into a repository.

A fourth aspect of the present invention provides a method for deploying a system for exchanging catalogue information, comprising: providing a computer infrastructure being configured to centrally receive Information Technology (IT) catalogue information from a plurality of providers, the IT catalogue information comprising a plurality a information levels; consolidate the IT catalogue information into a central catalogue using extensible markup language (XML); and load the central catalogue into a repository.

A fifth aspect of the present invention provides computer software embodied in a propagated signal for exchanging catalogue information, the computer software comprising instructions for causing a computer system to: centrally receive Information Technology (IT) catalogue information from a plurality of providers, the IT catalogue information comprising a plurality a information levels; consolidate the IT catalogue information into a central catalogue using extensible markup language (XML); and load the central catalogue into a repository.

A fifth aspect of the present invention provides a data processing system for exchanging catalogue information, comprising: a memory medium having instructions, a bus coupled to the memory medium, and a processor coupled to the bus, which when executing the instruction, causes the data processing system to: centrally receive Information Technology (IT) catalogue information from a plurality of providers, the IT catalogue information comprising a plurality a information levels; consolidate the IT catalogue information into a central catalogue using extensible markup language (XML); and load the central catalogue into a repository.

A sixth aspect of the present invention provides a computer-implemented business method for exchanging catalogue information, comprising: centrally receiving Information Technology (IT) catalogue information from a plurality of providers, the IT catalogue information comprising a plurality a information levels; consolidating the IT catalogue information into a central catalogue using extensible markup language (XML); and loading the central catalogue into a repository.

Each of these aspects can also include one or more of the following additional aspects:

The central catalogue is provided to a customer by: determining an identity of the customer; determining a communication protocol used by the customer based on the identity; and providing the central catalogue to the customer using the communication protocol.

The communication protocol can be selected from a group consisting of hypertext transfer protocol (HTTP), hypertext transfer protocol over secure socket (HTTPS), file transfer protocol (FTP), message queue (MQ), and simple message transfer protocol (SMTP).

The plurality of information levels can comprise at least one nested information level.

The plurality of providers can comprise at least one procurement services provider.

The plurality of providers can comprise at least one vendor of IT products.

The central catalogue can comprise multiple prices for at least one IT product identified in the IT catalogue information.

The multiple prices can comprise a vendor price corresponding for obtaining the at least one IT product from a vendor, and a procurement price for obtaining the at least one IT product from a procurement services provider.

BRIEF DESCRIPTION OF THE DRAWINGS

These and other features of this invention will be more readily understood from the following detailed description of the various aspects of the invention taken in conjunction with the accompanying drawings in which.

Figure 1:
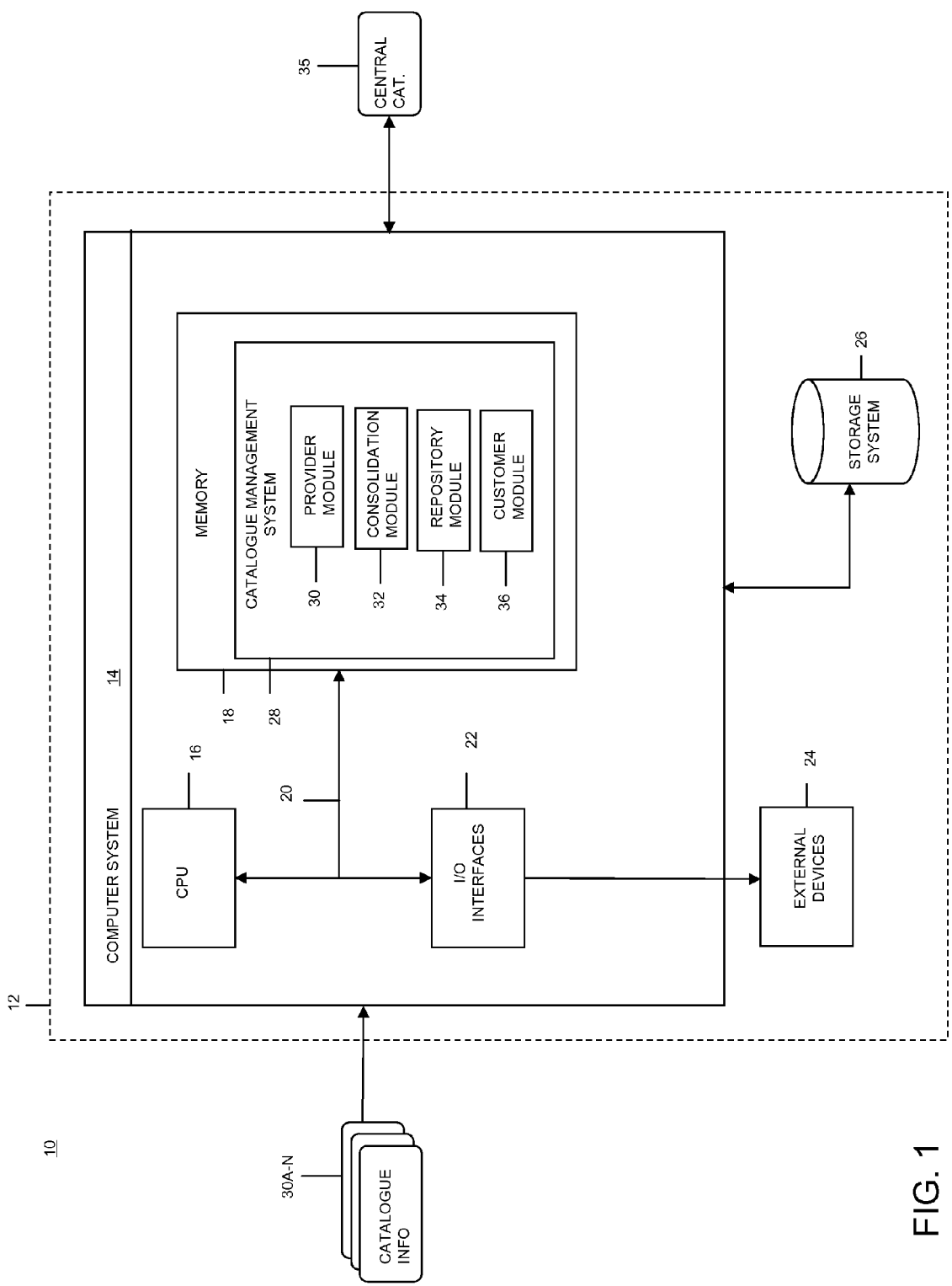
FIG. 1 shows a framework for exchanging catalogue information according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, this invention seamlessly facilitates information exchange between not only a vendor and a single customer but also between vendors and Procurement Services Providers (PSPs), supporting more than one customer, each with its unique specifications. This framework also has the capability to handle dual pricing. Dual pricing is used to differentiate the price that a PSP has negotiated with a vendor from the price that an end user/customer will be ultimately charged. These two levels of pricing are maintained at the customer/vendor level. This invention is used to create a framework for exchanging catalogue information between the vendors or vendors of IT products and a customer or a PSP acting on behalf of one or more customers This framework generally focuses on the IT Products supply chain. The information exchanged in the transactions involving IT products is normally quite different from other transactions. There has been no solution available in the market place that specifically addresses transactions involving IT products. In addition, this framework allows the PSP or customer to automatically load all the catalogue information from different vendors into their requisition tool. This electronic catalogue has all of the required information needed by an end user to easily generate a requisition for IT products from one or more vendors. This enables a customer to efficiently manage the procurement of specific IT products by reducing key strokes, errors and the effort to publish & maintain product sales information. An intent of this framework is used for procurement processes only. This process will also provide the capability to automate the periodic flow of product sales information to PSPs and customers by the vendors.

Referring now to FIG. 1, a more detailed diagram of a framework 10 of the present invention is shown. As depicted, framework 10 includes computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of framework 10 could be deployed, managed, serviced, etc. by a service provider who offers to implement, deploy, and/or perform the functions of the present invention for others.

As shown, computer system 14 includes a processing unit 16, a memory 18, a bus 20, and input/output (I/O) interfaces 22. Further, computer system 14 is shown in communication with external I/O devices/resources 24 and storage system 26. In general, processing unit 16 executes computer program code, such as catalogue management system 28, which is stored in memory 18 and/or storage system 26. While executing computer program code, processing unit 16 can read and/or write data to/from memory 18, storage system 26, and/or I/O interfaces 22. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the process(es) of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or storage system 26 can comprise any combination of various types of data storage and/or transmission media that reside at one or more physical locations. Further, I/O interfaces 22 can comprise any system for exchanging information with one or more external device 24. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 24 (e.g., a display) and/or storage system 26 could be contained within computer system 14, not externally as shown.

Storage system (also referred to herein as a repository) 16 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). In addition, although not shown, additional components, such as cache memory, communication systems, system software, etc., may be incorporated into computer system 14.

Shown in memory 18 of computer system 14 is catalogue management system 28, which facilitates the functions as described herein. As depicted, catalogue management system 28 includes provider module 30, consolidation module 32, repository module 34, and customer module 36. It should be understood that this configuration of functionality is intended to be illustrative only, and that identical or similar functionality could be provided with a different configuration of systems.

As indicated above, the purchase of an IT product is quite different in various aspects from general procurement activity. It is normally necessary to track IT products with many levels of domains and classifications. For example, let us say a customer wants to place an order for a desktop, memory card and an A/C adapter. The catalogue information sent to the customer could have nested level(s) of information such as the following The desktop would be classified with:
  (a) Domain—Hardware
  (b) Product Class—Computer Systems
  (c) Sub-Class—Desktop
  (d) Manufacturer's Product family—Intellistation Pro The Memory would be classified with:
  (a) Domain—Hardware
  (b) Product Class—Memory
  (c) Sub-Class—System RAM
  (d) Manufacturer's Product family—1 GB PC2-4200

The AC adapter would be classified with:
  (a) Domain—Accessories
  (b) Product Class—Electrical Supplies
  (c) Sub-Class—Chargers or Adapters
  (d) Manufacturer's Product family—AC Adapter Customers frequently need to track the IT products they order by their Serial Numbers. This is typically required for financial asset management, equipment refreshes and upgrades, software license management and license compliance and equipment moves. The IT products that the PSP or customer needs could be procured from many different vendors, each with different negotiated pricing. The catalogue that is sent to the PSP or customer needs to have this comprehensive information. The pricing information needs to be represented with the associated currency and country information. The products normally need to have a country specific SKU in addition to global/Manufacturer part number.

Framework 10 is geared to facilitate the exchange of catalogue data with this level of granularity. In this aspect this invention separates itself from the typical Business to Business solutions available in the market currently. Framework 10 allows the catalogue information to be published to the customers in 3 main scenarios:
  1. To publish a whole new catalogue
  2. To replace a existing full catalogue with new data
  3. To update a previously published catalogue with changes.

A core item for the implementation of framework 10 is an extensible markup language (XML) standard. This is facilitated using a DTD or Schema that has been designed exclusively for the exchange of catalogue information. A sample DTD is provided. This DTD or Schema ensures that the exchange of information is fully automated, eliminating manual entry errors and minimizing the time needed to load the catalogue data. The catalogue information in XML format can be exchanged using any of the industry standard open protocols such as hypertext transfer protocol (HTTP), hypertext transfer protocol over secured sockets layer (HTTPS), file transfer protocol (FTP), message queue (MQ) or simple message transfer protocol (SMTP). Depending upon the infrastructure available at the concerned parties, the exchange of information could be done real-time using SOAP services or WebServices (Enterprise Service Bus—ESB).

Catalogue management system 28, which is responsible for creating and sending the XML catalogue based on the framework proposed in this solution should collect catalogue information from all of its vendors/vendors and store it in their catalogue repository. There may be a variety of protocols used by various vendors in providing the catalogue information such as e-Mail, CIF catalogue format, EDI, Excel (Excel is a trademark of Microsoft Corp. in the United States and/or other countries), flat file or XML. Catalogue management system 28 will consolidate all of the data received from various points and load it into a central repository at the customer/vendor level. Catalogue management system 28 could have a Master catalogue where it stores catalogue data at the manufacturer level for all of the customers and they can have customer level data at the vendor/pricing level which is typically used to exchange the data in XML format. In any event, once the customer level catalogue information is available in a central repository it makes it easier to format the XML catalogue based on the framework defined thru this invention and exchange it to the corresponding customers/PSP.

Figure 2:
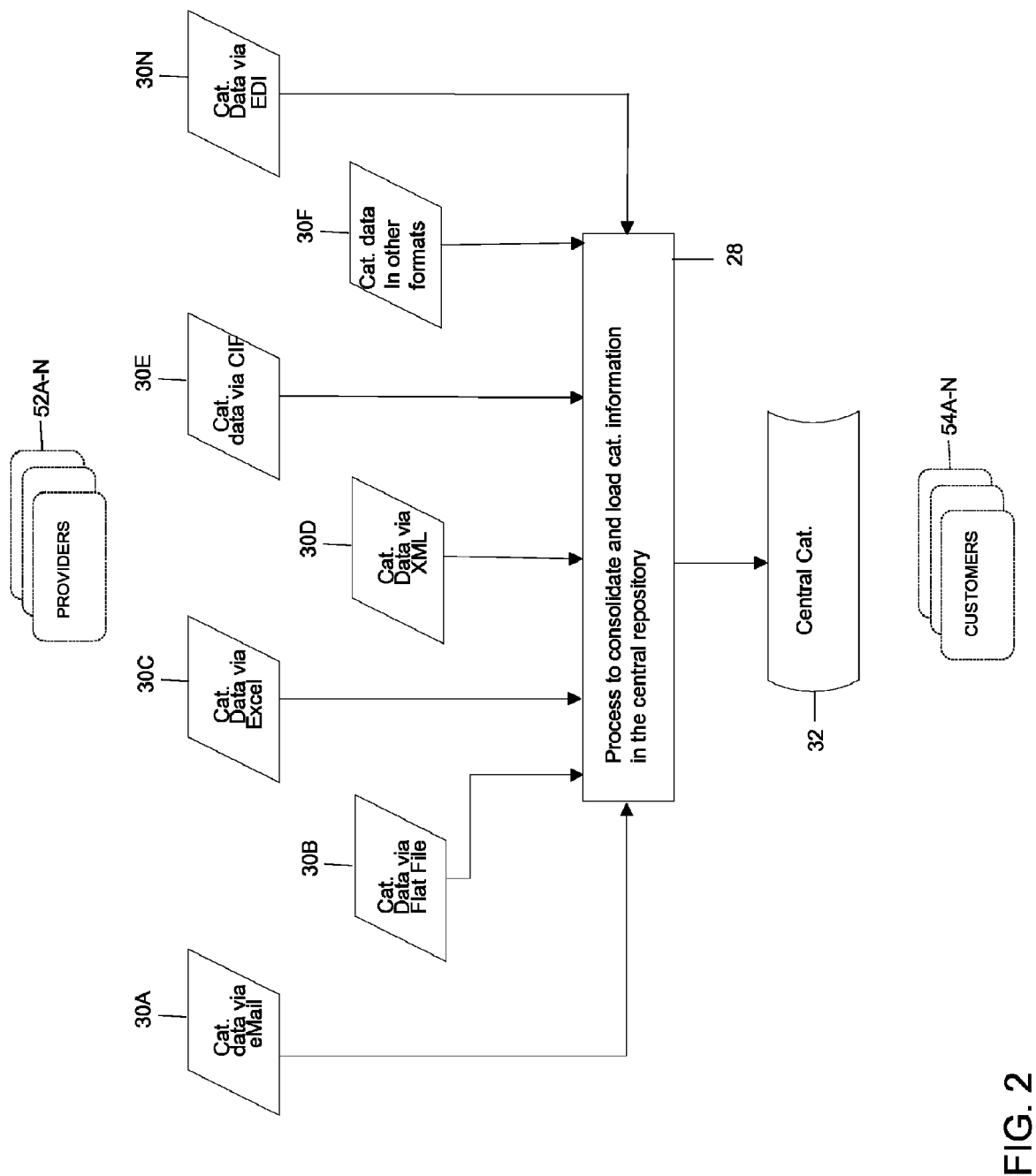
FIG. 2 shows a process flow diagram for centrally cataloging IT catalogue information received from a plurality of sources according to the present invention.
Figure 3:
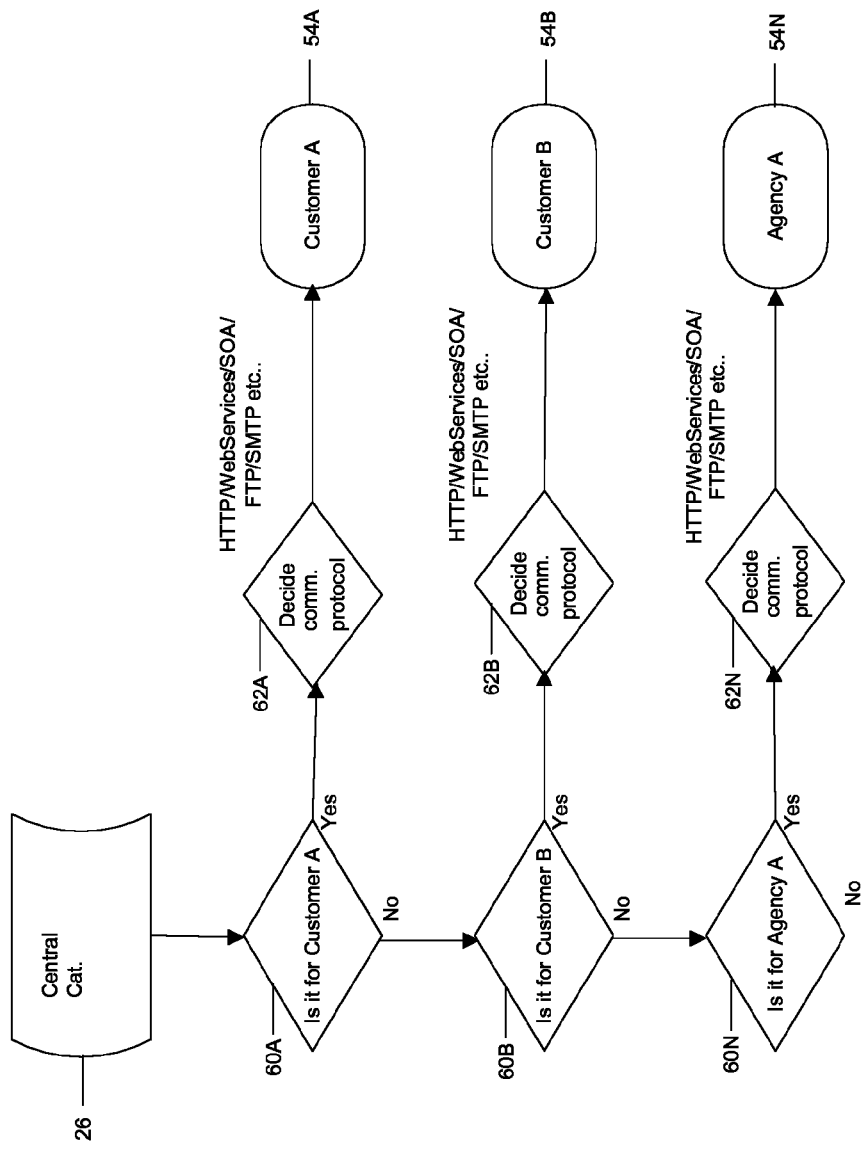
FIG. 3 shows a process flow diagram for communicating a central catalogue to customers according to the customers' respective communication protocols.

These concepts will now be further explained in conjunction with FIGS. 1-3 collectively. First, IT catalogue information 30A-N is centrally from providers 52A-N received via provider module 30. IT catalogue information 30A-N can be received in any format now known or later developed such as those shown in FIG. 2. In addition, IT catalogue information 30A-N typically has multiple levels of information, and possibly even one or more nested levels of information. Still yet, the term providers 52A-N should be understood to mean vendors and/or PSPs. Upon receipt, consolidation module 32 will consolidate the IT catalogue information into a central catalogue 35 using extensible markup language (XML). As indicated above, central catalogue 35 can include multiple prices for at least one IT product identified in the IT catalogue information. For example, central catalogue 35 can include a vendor price corresponding for obtaining product 'A' from a vendor, and a procurement price for obtaining product 'A' from a procurement services provider. In any event, repository module 34 will load central catalogue 35 into a repository such as storage system 26. Customer module 36 will then provide central catalogue to customers 54A-N.

The procedure followed by customer module 36 is shown in FIG. 3. In summary customer module will determine an identity of the customer (illustrated by decision points 60A-N of FIG. 3), determine a communication protocol used by the customer based on the identity (illustrated by decision points 62A-N of FIG. 3), and then provide the central catalogue to the customer 52A-N using the communication protocol. The current invention can accommodate any communication protocol now known or later developed including those shown in FIG. 3. Examples include, among others, hypertext transfer protocol (HTTP), hypertext transfer protocol over secure socket (HTTPS), file transfer protocol (FTP), message queue (MQ), and simple message transfer protocol (SMTP).

XML Schema Associated with the Above Framework 10:

```xml
<?xml version="1.0" encoding="UTF-8"?>
<xsd:schema xmlns:xsd="http://www.w3.org/2001/XMLSchema">
<xsd:element name="TAASCATALOG">
<xsd:annotation>
<xsd:documentation> </xsd:documentation>
</xsd:annotation>
<xsd:complexType>
<xsd:sequence>
<xsd:element ref="LOGIN"/>
<xsd:element maxOccurs="unbounded" minOccurs="1" ref="CATALOGDATA"/>
</xsd:sequence>
</xsd:complexType>
</xsd:element>
<xsd:element name="LOGIN">
<xsd:complexType>
<xsd:sequence>
<xsd:element ref="USERID"/>
<xsd:element ref="PASSWORD"/>
<xsd:element ref="TRANID"/>
</xsd:sequence>
</xsd:complexType>
</xsd:element>
<xsd:element name="CATALOGDATA">
<xsd:complexType>
<xsd:sequence maxOccurs="unbounded" minOccurs="0">
<xsd:element ref="CUSTOMERID"/>
<xsd:element maxOccurs="unbounded" minOccurs="1" ref="CATALOGITEM"/>
</xsd:sequence>
</xsd:complexType>
</xsd:element>
<xsd:element name="USERID" type="xsd:string"/>
<xsd:element name="PASSWORD" type="xsd:string"/>
<xsd:element name="TRANID" type="xsd:string"/>
<xsd:element name="CATALOGITEM">
<xsd:complexType>
<xsd:sequence>
<xsd:element ref="MAINTENANCEFLAG"/>
<xsd:element ref="MFRPARTNUMBER"/>
<xsd:element ref="PARTDESCRIPTION"/>
<xsd:element maxOccurs="1" minOccurs="0" ref="UNSPSCCODE"/>
<xsd:element ref="BASEUNITIND"/>
<xsd:element ref="MANUFACTURER"/>
<xsd:element maxOccurs="1" minOccurs="0" ref="SHORTNAMEDESCRIPTION"/>
<xsd:element maxOccurs="1" minOccurs="0" ref="CLASSIFICATION"/>
<xsd:element maxOccurs="1" minOccurs="0" ref="CATALOGCOMMENT"/>
<xsd:element maxOccurs="unbounded" minOccurs="0" ref="EXTRINSIC"/>
<xsd:element maxOccurs="unbounded" minOccurs="0" ref="VENDORDATA"/>
</xsd:sequence>
</xsd:complexType>
</xsd:element>
<xsd:element name="CLASSIFICATION">
<xsd:complexType>
<xsd:sequence>
<xsd:element maxOccurs="1" minOccurs="0" ref="DOMAIN"/>
<xsd:element maxOccurs="1" minOccurs="0" ref="PRODUCTCLASS"/>
<xsd:element maxOccurs="1" minOccurs="0" ref="PRODUCTSUBCLASS"/>
<xsd:element maxOccurs="1" minOccurs="0" ref="MFRPRODUCTFAMILY"/>
</xsd:sequence>
</xsd:complexType>
</xsd:element>
<xsd:element name="VENDORDATA">
<xsd:complexType>
<xsd:sequence>
<xsd:element ref="VENDORID"/>
<xsd:element maxOccurs="1" minOccurs="0" ref="VENDORPARTNUMBER"/>
<xsd:element ref="PRICE"/>
<xsd:element maxOccurs="1" minOccurs="0" ref="CUSTOMERPRICE"/>
<xsd:element ref="CURRENCYCODE"/>
<xsd:element maxOccurs="1" minOccurs="0" ref="COUNTRYCODE"/>
<xsd:element ref="EFFECTIVEDATE"/>
<xsd:element maxOccurs="1" minOccurs="0" ref="EXPIRATIONDATE"/>
<xsd:element maxOccurs="1" minOccurs="0" ref="SERIALNUMBERREQUIRED"/>
<xsd:element maxOccurs="1" minOccurs="0" ref="ASSETTAGREQUIRED"/>
</xsd:sequence>
</xsd:complexType>
</xsd:element>
<xsd:element name="CUSTOMERID" type="xsd:string"/>
<xsd:element name="MAINTENANCEFLAG" type="xsd:string"/>
```

```
<xsd:element name="MFRPARTNUMBER" type="xsd:string">
<xsd:annotation>
<xsd:documentation>
</xsd:documentation>
</xsd:annotation>
</xsd:element>
<xsd:element name="VENDORPARTNUMBER" type="xsd:string"/>
<xsd:element name="PARTDESCRIPTION" type="xsd:string"/>
<xsd:element name="UNSPSCCODE" type="xsd:string"/>
<xsd:element name="PRICE" type="xsd:string"/>
<xsd:element name="BASEUNITIND" type="xsd:string"/>
<xsd:element name="MANUFACTURER" type="xsd:string"/>
<xsd:element name="CUSTOMERPRICE" type="xsd:string"/>
<xsd:element name="SHORTNAMEDESCRIPTION" type="xsd:string"/>
<xsd:element name="CURRENCYCODE" type="xsd:string"/>
<xsd:element name="COUNTRYCODE" type="xsd:string"/>
<xsd:element name="SERIALNUMBERREQUIRED" type="xsd:string"/>
<xsd:element name="ASSETTAGREQUIRED" type="xsd:string"/>
<xsd:element name="EFFECTIVEDATE" type="xsd:string"/>
<xsd:element name="EXPIRATIONDATE" type="xsd:string"/>
<xsd:element name="CLASSIFICATIONCODE" type="xsd:string"/>
<xsd:element name="CATALOGCOMMENT" type="xsd:string"/>
<xsd:element name="VENDORID" type="xsd:string"/>
<xsd:element name="DOMAIN" type="xsd:string"/>
<xsd:element name="PRODUCTCLASS" type="xsd:string"/>
<xsd:element name="PRODUCTSUBCLASS" type="xsd:string"/>
<xsd:element name="MFRPRODUCTFAMILY" type="xsd:string"/>
<xsd:element name="EXTRINSIC">
<xsd:annotation>
<xsd:documentation>
</xsd:documentation>
</xsd:annotation>
<xsd:complexType>
<xsd:simpleContent>
<xsd:extension base="xsd:string">
<xsd:attribute name="name" type="xsd:string" use="required"/>
</xsd:extension>
</xsd:simpleContent>
</xsd:complexType>
</xsd:element>
</xsd:schema>
```

XML DTD Associated with the Above Framework 10:

```
<?xml version="1.0" encoding="UTF-8"?>
<!-- -->
<!ELEMENT TAASCATALOG (LOGIN,CATALOGDATA+)>
<!ELEMENT LOGIN (USERID,PASSWORD,TRANID)>
<!ELEMENT CATALOGDATA (CUSTOMERID,CATALOGITEM+)*>
<!ELEMENT USERID (#PCDATA)>
<!ELEMENT PASSWORD (#PCDATA)>
<!ELEMENT TRANID (#PCDATA)>
<!ELEMENT CATALOGITEM
(MAINTENANCEFLAG,MFRPARTNUMBER,PARTDESCRIPTION,UNSPSCCODE
?,BASEUNITIND,MANUFACTURER,SHORTNAMEDESCRIPTION?,CLASSIFICATION
?,CATALOGCOMMENT?,EXTRINSIC*,VENDORDATA*)>
<!ELEMENT CLASSIFICATION
(DOMAIN?,PRODUCTCLASS?,PRODUCTSUBCLASS?,MFRPRODUCTFAMILY
?)>
<!ELEMENT VENDORDATA
(VENDORID,VENDORPARTNUMBER?,PRICE,CUSTOMERPRICE?,CURRENCY
CODE,COUNTRYCODE?,EFFECTIVEDATE,EXPIRATIONDATE?,SERIALNUMBER
REQUIRED?,ASSETTAGREQUIRED?)>
<!ELEMENT CUSTOMERID (#PCDATA)>
<!ELEMENT MAINTENANCEFLAG (#PCDATA)>
<!-- -->
<!ELEMENT MFRPARTNUMBER (#PCDATA)>
<!ELEMENT VENDORPARTNUMBER (#PCDATA)>
<!ELEMENT PARTDESCRIPTION (#PCDATA)>
<!ELEMENT UNSPSCCODE (#PCDATA)>
<!ELEMENT PRICE (#PCDATA)>
<!ELEMENT BASEUNITIND (#PCDATA)>
<!ELEMENT MANUFACTURER (#PCDATA)>
<!ELEMENT CUSTOMERPRICE (#PCDATA)>
<!ELEMENT SHORTNAMEDESCRIPTION (#PCDATA)>
<!ELEMENT CURRENCYCODE (#PCDATA)>
```

-continued

```
<!ELEMENT COUNTRYCODE (#PCDATA)>
<!ELEMENT SERIALNUMBERREQUIRED (#PCDATA)>
<!ELEMENT ASSETTAGREQUIRED (#PCDATA)>
<!ELEMENT EFFECTIVEDATE (#PCDATA)>
<!ELEMENT EXPIRATIONDATE (#PCDATA)>
<!ELEMENT CLASSIFICATIONCODE (#PCDATA)>
<!ELEMENT CATALOGCOMMENT (#PCDATA)>
<!ELEMENT VENDORID (#PCDATA)>
<!ELEMENT DOMAIN (#PCDATA)>
<!ELEMENT PRODUCTCLASS (#PCDATA)>
<!ELEMENT PRODUCTSUBCLASS (#PCDATA)>
<!ELEMENT MFRPRODUCTFAMILY (#PCDATA)>
<!-- -->
<!ELEMENT EXTRINSIC (#PCDATA)>
```

While shown and described herein as a method and system for exchanging catalogue information, it is understood that the invention further provides various alternative embodiments. For example, in one embodiment, the invention provides a computer-readable/useable medium that includes computer program code to enable a computer infrastructure to exchange catalogue information. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to exchange catalogue information. In this case, the service provider can create, maintain, support, etc., a computer infrastructure, such as computer infrastructure 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for exchanging catalogue information. In this case, a computer infrastructure, such as computer infrastructure 12 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for exchanging catalogue information, comprising:

centrally receiving, at a computer device, Information Technology (IT) catalogue information that includes a plurality of provider catalogues from a plurality of providers using a plurality of preferred vendor formats, each of the plurality of providers offering IT products, the IT catalogue information comprising a plurality of information levels that provide increasingly detailed description details regarding the IT products;

consolidating, using the computer device, the IT catalogue information into a central catalogue, the consolidation including, for each of the plurality of providers, automatically converting the IT catalogue information from a preferred vendor format to the central catalogue using extensible markup language (XML) while maintaining the plurality of information levels across the plurality of providers; and loading the central catalogue into a repository.

2. The method of claim 1, further comprising providing the central catalogue to a customer, the providing comprising:
determining an identity of the customer;
determining a communication protocol used by the customer based on the identity; and
providing the central catalogue to the customer using the communication protocol.

3. The method of claim 2, the communication protocol being selected from a group consisting of hypertext transfer protocol (HTTP), hypertext transfer protocol over secure socket (HTTPS), file transfer protocol (FTP), message queue (MQ), and simple message transfer protocol (SMTP).

4. The method of claim 1, the plurality of information levels comprising at least one nested information level.

5. The method of claim 1, the plurality of providers comprising at least one procurement services provider.

6. The method of claim 1, the plurality of providers comprising at least one vendor of IT products.

7. The method of claim 1, the central catalogue comprising multiple prices for at least one IT product identified in the IT catalogue information.

8. The method of claim 7, multiple prices comprising a vendor price corresponding for obtaining the at least one IT product from a vendor, and a procurement price for obtaining the at least one IT product from a procurement services provider.

9. A system for exchanging catalogue information, comprising:
at least one computer device, having:
a module for centrally receiving Information Technology (IT) catalogue information that includes a plurality of provider catalogues from a plurality of providers using a plurality of preferred vendor formats, each of the plurality of providers offering IT products, the IT catalogue information comprising a plurality of information levels that provide increasingly detailed description details regarding the IT products;
a module for consolidating the IT catalogue information into a central catalogue, the consolidation including, for each of the plurality of providers, automatically converting the IT catalogue information from a preferred vendor format to the central catalogue using extensible markup language (XML) while maintaining the plurality of information levels across the plurality of providers; and
a module for loading the central catalogue into a repository.

10. The system of claim 9, further comprising a module for providing the central catalogue to the customer, the module for providing being configured to:
determine an identity of the customer;
determine a communication protocol used by the customer based on the identity; and
provide the central catalogue to the customer using the communication protocol.

11. The system of claim 10, the communication protocol being selected from a group consisting of hypertext transfer protocol (HTTP), hypertext transfer protocol over secure socket (HTTPS), file transfer protocol (FTP), message queue (MQ), and simple message transfer protocol (SMTP).

12. The system of claim 9, the plurality of information levels comprising at least one nested information level.

13. The system of claim 9, the plurality of providers comprising at least one procurement services provider.

14. The system of claim 9, the plurality of providers comprising at least one vendor of IT products.

15. The system of claim 9, the IT catalogue information comprising multiple prices for a single IT product identified in the IT catalogue information.

16. The system of claim 15, the multiple prices comprising a vendor price for obtaining the at least one IT product from a vendor, and a procurement price for obtaining the at least one IT product from a procurement services provider.

17. A program product stored on a computer readable storage medium for exchanging catalogue information, the computer readable medium comprising program code for causing a computer system to:
centrally receive Information Technology (IT) catalogue information that includes a plurality of provider catalogues from a plurality of providers using a plurality of preferred vendor formats, each of the plurality of providers offering IT products, the IT catalogue information comprising a plurality of information levels that provide increasingly detailed description details regarding the IT products;
consolidate the IT catalogue information into a central catalogue, the consolidation including, for each of the plurality of providers, automatically converting the IT catalogue information from a preferred vendor format to the central catalogue using extensible markup language (XML) while maintaining the plurality of information levels across the plurality of providers; and
load the central catalogue into a repository.

18. The program product of claim 17, the computer readable medium further comprising program code for causing the computer system to:
determine an identity of the customer;
determine a communication protocol used by the customer based on the identity; and
provide the central catalogue to the customer using the communication protocol.

19. The method of claim 18, the communication protocol being selected from a group consisting of hypertext transfer protocol (HTTP), hypertext transfer protocol over secure socket (HTTPS), file transfer protocol (FTP), message queue (MQ), and simple message transfer protocol (SMTP).

20. The program product of claim 17, the plurality of information levels comprising at least one nested information level.

21. The program product of claim 17, the plurality of providers comprising at least one procurement services provider.

22. The program product of claim 17, the plurality of providers comprising at least one vendor of IT products.

23. The program product of claim 17, the IT catalogue information comprising multiple prices for a single IT product identified in the IT catalogue information.

24. The program product of claim 23, the multiple prices comprising a vendor price corresponding for obtaining the at least one IT product from a vendor, and a procurement price for obtaining the at least one IT product from a procurement services provider.

25. A method for deploying a system for exchanging catalogue information, comprising:
providing a computer infrastructure, having at least computer device being configured to centrally receive Information Technology (IT) catalogue information that includes a plurality of provider catalogues from a plurality of providers using a plurality of preferred vendor formats, each of the plurality of providers offering IT products, the IT catalogue information comprising a plurality of information levels that provide increasingly detailed description details regarding the IT products;

consolidate the IT catalogue information into a central catalogue, the consolidation including, for each of the plurality of providers, automatically converting the IT catalogue information from a preferred vendor format to the central catalogue using extensible markup language (XML) while maintaining the plurality of information levels across the plurality of providers; and load the central catalogue into a repository.

26. The method of claim 25, the computer infrastructure being further configured to:

determine an identity of the customer;

determine a communication protocol used by the customer based on the identity; and provide the central catalogue to the customer using the communication protocol.

* * * * *